United States Patent
Fei et al.

(10) Patent No.: US 11,543,032 B2
(45) Date of Patent: Jan. 3, 2023

(54) LAST-STAGE PRESSURE DROP-ADJUSTABLE MULTISTAGE BRUSH SEAL STRUCTURE

(71) Applicant: FUDAN UNIVERSITY, Shanghai (CN)

(72) Inventors: Chengwei Fei, Shanghai (CN); Guoqiang Zhang, Shanghai (CN)

(73) Assignee: Fudan University, Shanghai (CN)

( * ) Notice: Subject to any disclaimer, the term of this patent is extended or adjusted under 35 U.S.C. 154(b) by 117 days.

(21) Appl. No.: 17/101,814

(22) Filed: Nov. 23, 2020

(65) Prior Publication Data
US 2021/0356045 A1    Nov. 18, 2021

(30) Foreign Application Priority Data
May 14, 2020 (CN) .......................... 202010409025.2

(51) Int. Cl.
  *F16J 15/3288* (2016.01)
(52) U.S. Cl.
  CPC ................................ *F16J 15/3288* (2013.01)
(58) Field of Classification Search
  CPC .... F16J 15/00; F16J 15/16; F16J 15/50; F16J 15/52; F16J 15/3268; F16J 15/3288
  USPC ......................................................... 277/355
  See application file for complete search history.

(56) References Cited

U.S. PATENT DOCUMENTS

| 6,623,238 B2 * | 9/2003 | Langston | F01D 11/00 415/112 |
| 9,664,117 B2 * | 5/2017 | Belmonte | F01D 25/16 |
| 9,784,371 B2 * | 10/2017 | Franceschini | F16J 15/3244 |
| 2015/0192207 A1 * | 7/2015 | Stoakes | B60B 27/065 277/500 |

FOREIGN PATENT DOCUMENTS

EP    3550184 A1 * 10/2019 ............ F01D 11/003

\* cited by examiner

*Primary Examiner* — Nathan Cumar
(74) *Attorney, Agent, or Firm* — Jeffrey D. Moy; Weiss & Moy, PC

(57) ABSTRACT

A last-stage pressure drop-adjustable multistage brush seal structure. The seal structure comprises a stator casing, gears, gear shafts, stator casing vent holes, a brush wire beam, downstream brush seal piece vent through holes, downstream brush seal upper side gear teeth, and the like. The stator casing is stationary. An upstream brush seal piece is fixedly mounted on the inner side of the stator casing. According to the last-stage pressure drop-adjustable multistage brush seal structure, reverse driving force moment in an inclined direction of brush wires is given to the gear shafts, torsion moment is transferred to the gears through the gear shafts, and the downstream brush seal piece gear teeth are engaged with the downstream brush seal piece and transfer the torsion moment to the downstream brush seal piece, such that the downstream brush seal piece rotates around a rotor.

1 Claim, 4 Drawing Sheets ns the Chinese Patent Office on May 14, 2020, which is incorporated herein by reference in its entirety.

LAST-STAGE PRESSURE DROP-ADJUSTABLE MULTISTAGE BRUSH SEAL STRUCTURE

RELATED APPLICATIONS

This application claims the priority of Chinese Patent Application No. 202010409025.2 entitled "Last-Stage Pressure Drop-Adjustable Multistage Brush Seal Structure" filed with the Chinese Patent Office on May 14, 2020, which is incorporated herein by reference in its entirety.

TECHNICAL FIELD

The disclosure belongs to the technical field of mechanical dynamic seal structures, and particularly relates to a last-stage pressure drop-adjustable multistage brush seal structure.

BACKGROUND

A seal technology has become a key technology for developing a turbomachinery with high performance and high reliability. A labyrinth seal as a non-contact dynamic seal has the characteristics of simple structure, low cost and easiness in replacement, and is widely applied to the turbomachinery. However, an inherent clearance exists between the labyrinth seal and a rotor, so the leakage amount of the labyrinth seal is larger than that of a contact brush seal. Particularly, when the rotor occurs instantaneous radial migration, labyrinth teeth will cause permanent wear, thereby increasing the seal clearance, and reducing the sealing performance. In a brush seal, when the rotor occurs the instantaneous radial migration, elastic yielding will be produced by the flexibility of brush wires. When the rotor is restored from an eccentric position, the brush wires will follow the rotor in time under the action of elastic restoring force to ensure good sealing performance. Compared with the labyrinth seal, the brush seal as a contact dynamic seal has more excellent, stable and lasting sealing performance, but it may be limited by contact speed, pressure bearing capacity and the like, and may produce a frictional thermal effect, a hysteresis effect and the like. A single-stage or multistage seal is formed by replacing the labyrinth teeth in the labyrinth seal with a brush wire beam, which has excellent and lasting sealing performance, and meanwhile, has strong pressure bearing capacity.

Researches show that the volume flow rate of the multistage brush seal is increased unevenly stage by stage in a flowing direction of gas flow, each stage of pressure drop is increased along with the uneven increment of the volume flow rate stage by stage, the pressure drop born by each stage is increased stage by stage, and the most downstream brush seal piece bears great inter-stage pressure drop, so the most downstream brush wires are more likely to be damaged because of the inter-stage pressure drop, so as to cause short-term failure of the most downstream brush seal piece. The failure of the most downstream brush seal is transferred to an upstream brush seal piece, so the sealing effect and the reliability of the overall multistage brush seal piece are significantly reduced, and meanwhile, the maintenance cost is increased.

Therefore, how to balance the pressure drop of the downstream brush seal, and ensure long-term stable safe and reliable work of the multistage brush seal in the case of ensuring a low leakage amount becomes an urgent problem to be solved by people.

SUMMARY

Aiming at the deficiencies in the prior art, the disclosure provides a last-stage pressure drop-adjustable multistage brush seal structure which can ensure long-term stable safe and reliable work of a multistage brush seal.

The last-stage pressure drop-adjustable multistage brush seal structure provided by the disclosure comprises a stator casing, gears, flat keys, gear shafts, stator casing vent holes, a front baffle plate, a brush wire beam, a rear baffle plate, downstream brush seal piece vent through holes, and downstream brush seal upper side gear teeth. The stator casing is stationary. Four gear shaft holes and twelve stator casing vent holes are uniformly formed in the downstream circumferential direction of the stator casing. The gear shaft holes are used for fixing the gear shafts. The twelve stator casing vent holes are uniformly distributed in clamping plates on two sides of a downstream brush seal piece. Six vent holes are formed in each clamping plate and are uniformly distributed in the circumferential direction. An upstream brush seal piece is fixedly mounted on the inner side of the stator casing by a melting and welding process. The gears are connected and fixed by the gear shafts which penetrate through the stator casing by means of the flat keys to provide supporting force required by the downstream brush seal piece. The gears are engaged with the downstream brush seal piece upper side gear teeth. A clearance is reserved between the gears and the inner side of the stator casing to ensure that the gears can drive the downstream brush seal piece to rotate. The gear shafts are arranged in corresponding gear shaft holes of the stator casing. The gear shafts rotate, by applying active driving force moment, in gear holes to drive the gears to rotate. The downstream brush seal piece vent through holes are formed in the upper side of the downstream brush seal piece and are communicated with the stator casing vent holes to connect upstream gas with downstream gas of the downstream brush seal piece. The gear teeth are formed on the upper side of the downstream brush seal piece. The gear teeth are engaged with the gears that are fixed to the gear shafts. The brush wire beam is fixed between the front baffle plate and the rear baffle plate by the melting and welding process. The free end of the brush wire beam is about 0.02 mm away from a rotor. The brush wire beam is mounted at an angle of 45 degrees. The front baffle plate and the rear baffle plate are arranged for ensuring the fixation of the brush wire beam. In addition, in order to prevent brush wires from axially deforming due to great axial pressure drop to affect the sealing performance, the rear baffle plate is slightly longer than the front baffle plate.

Relevant researches show that the axial pressure drop and the radial pressure drop born by a downstream brush wire beam are great, so there is obvious inter-stage disequilibrium. According to the last-stage pressure drop-adjustable multistage brush seal structure, the reverse driving force moment in an inclined direction of the brush wires is given to the gear shafts, torsion moment is transferred to the gears through the gear shafts, and the downstream brush seal piece gear teeth are engaged with the downstream brush seal piece to transfer the torsion moment to the downstream brush seal piece, such that the downstream brush seal piece rotates around a rotor. When the vent through holes in the upper side of the downstream brush seal piece are communicated with the stator casing vent holes, a small amount of upstream gas of a downstream brush seal passes through the stator casing vent holes and then flows to downstream through the vent through holes in the upper side of the downstream brush seal to balance inter-stage pressure of the downstream brush seal piece, so as to reduce the inter-stage pressure difference born by a downstream brush wire beam and prolong the service life of a brush seal. When the downstream brush seal piece is within a bearable pressure drop range, the vent through holes in the upper side of the downstream brush seal piece are staggered with the stator casing vent holes, thereby reducing the leakage amount and ensuring long-term stable safe and reliable work of the multistage brush seal piece.

The seal structure can balance the pressure drop of the downstream brush seal in the case of ensuring a low leakage amount. In addition, by means of changing the effective circulation area of the vent holes, the vent amount is controlled, and long-term stable safe and reliable work of the multistage brush seal is ensured.

The last-stage pressure drop-adjustable multistage brush seal structure adjusting provided the disclosure has the following main advantages that:

1. Compared with the conventional multistage brush seal structure, the vent holes are formed in the stator casing and a last-stage brush seal piece, which can effectively balance the inter-stage pressure drop, increase the reliability and the durability of the multistage brush seal, and reduce the maintenance cost.

2. Compared with the conventional multistage brush seal structure, accurate control of the vent amount can be realized by adding a driving force control system to match the number of the gear teeth, and changing the effective circulation area between the vent holes in the upper side of the last-stage brush seal and the vent holes of the stator casing.

3. Compared with the conventional multistage brush seal structure, the gears, the gear shafts, the flat keys, and the like, applied by the disclosure are all interchangeable parts, which facilitates the replacement of damaged parts.

Figure 1:
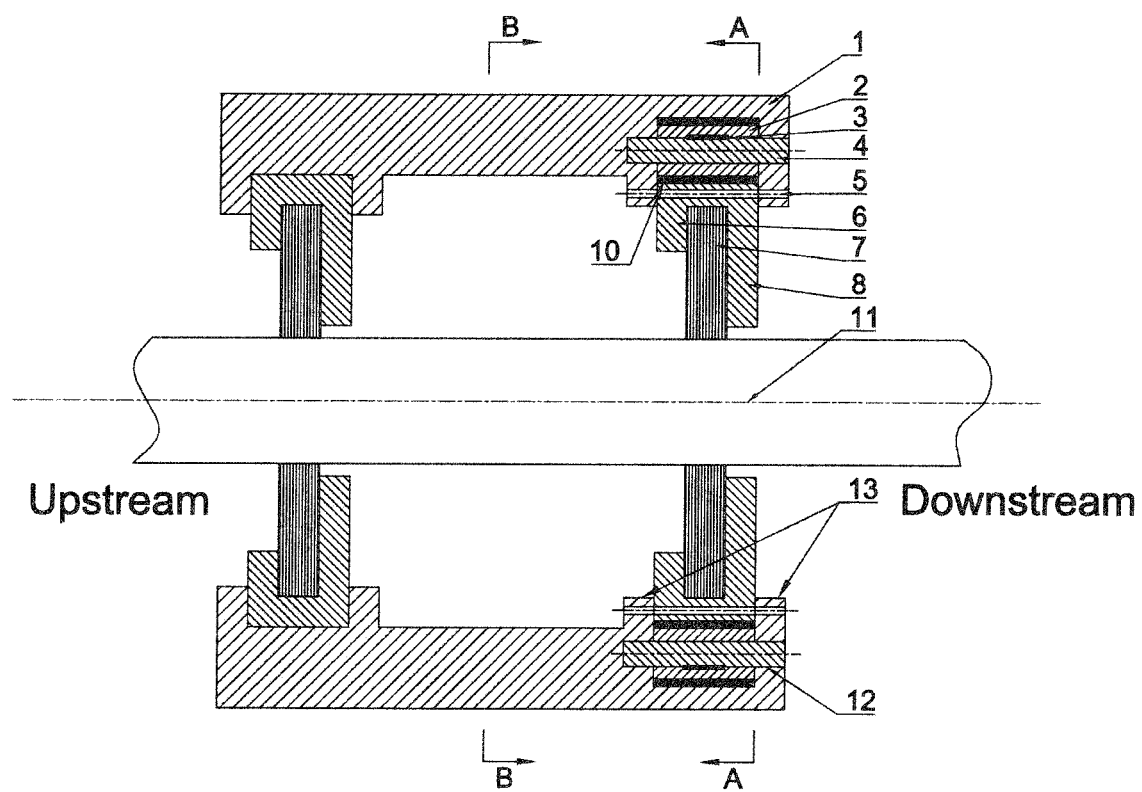
FIG. 1 is a schematic structural diagram of a last-stage pressure drop-adjustable multistage brush seal structure.

Reference signs in the drawings: 1—stator casing; 2—gear; 3—flat key; 4—gear shaft; 5—stator casing vent hole; 6—front baffle plate; 7—brush wire beam; 8—rear baffle plate; 9—downstream 15 brush seal piece vent through hole; 10—downstream brush seal gear tooth; 11—rotor; 12—gear shaft hole; 13—clamping plate.

DESCRIPTION OF THE EMBODIMENTS

Figure 2:
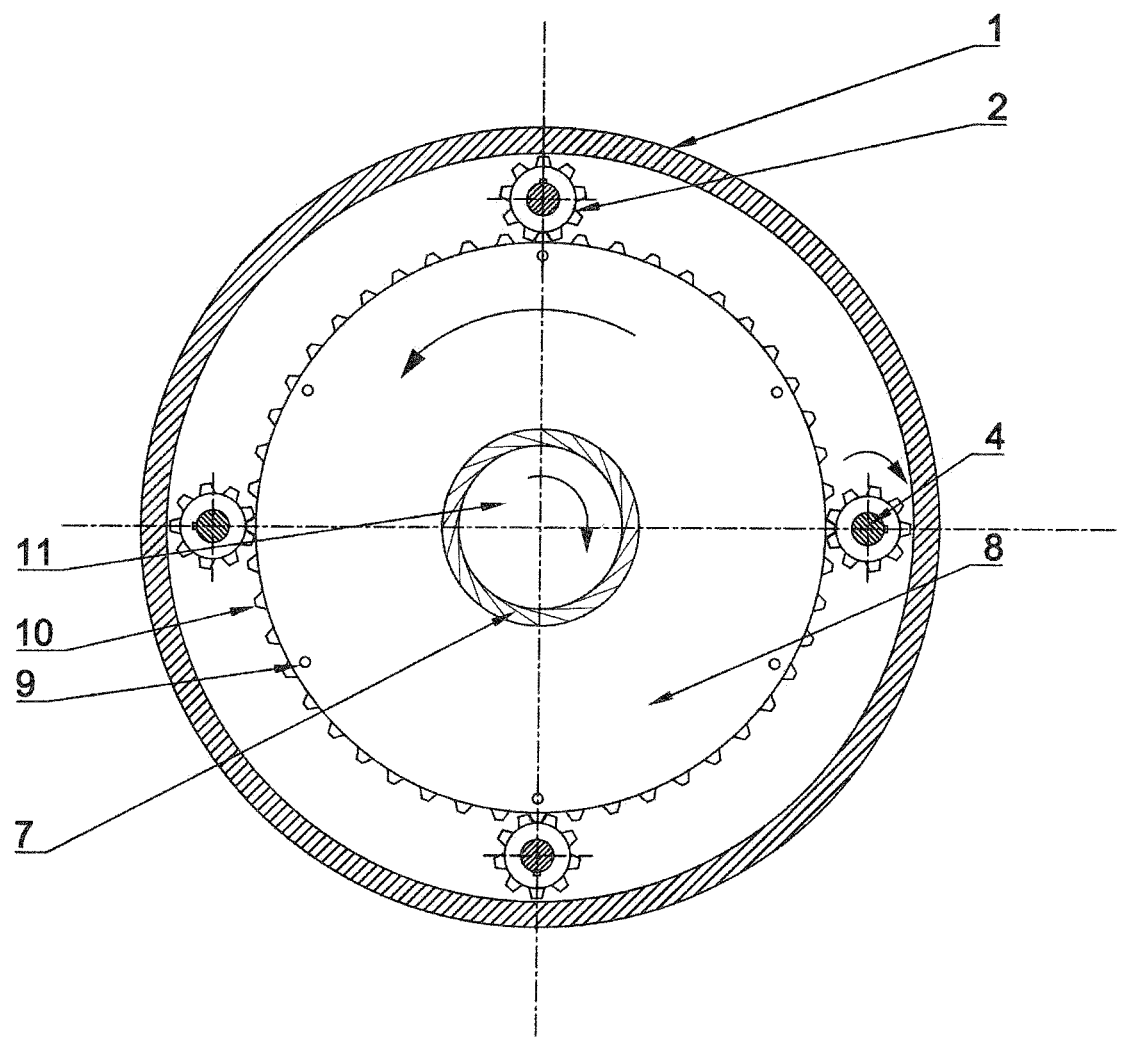
FIG. 2 is a section view of A-A of the FIG. 1.
Figure 3:
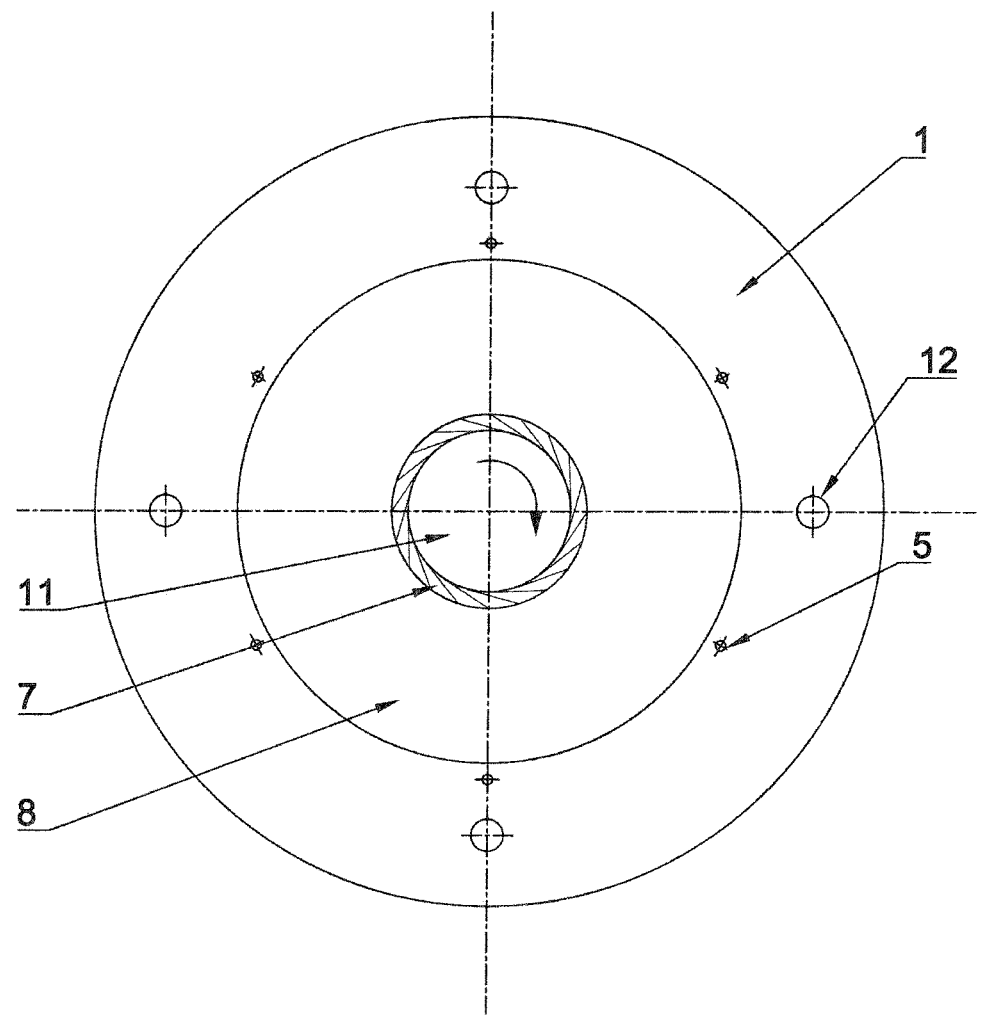
FIG. 3 is a right view of the last-stage pressure drop-adjustable multistage brush seal structure in FIG. 1.
Figure 4:
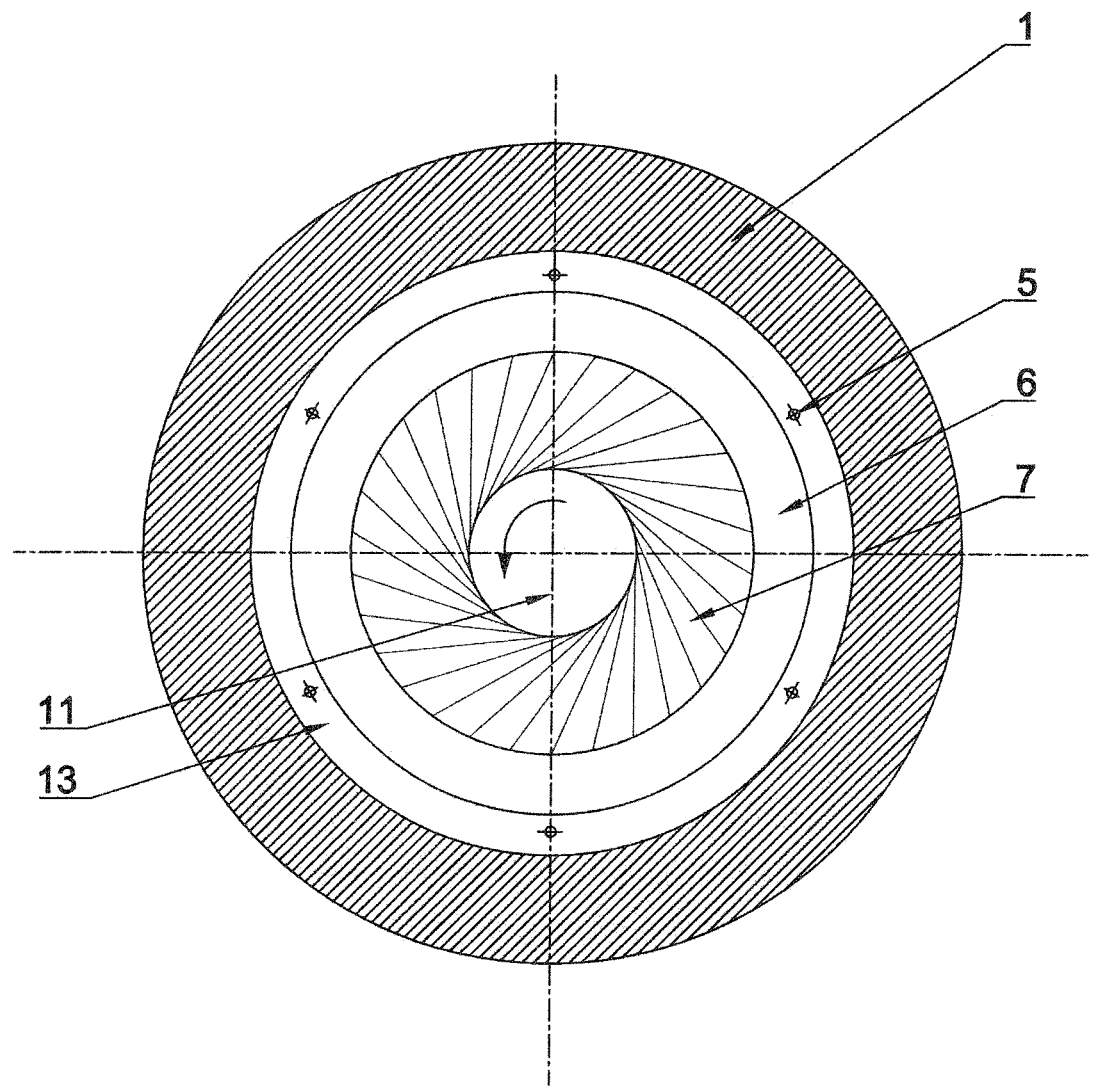
FIG. 4 is a section view of the last-stage pressure drop-adjustable multistage brush seal structure along line B-B in FIG. 1.

As shown in FIG. 1 and FIG. 2, a downstream pressure drop-adjustable multistage brush seal structure comprises: a stator casing 1, gears 2, flat keys 3, gear shafts 4, stator casing vent holes 5, a front baffle plate 6, a brush wire beam 7, a rear baffle plate 8, downstream brush seal piece vent through holes 9, and downstream brush seal upper side gear teeth 10. The stator casing 1 is stationary. Four gear shaft holes 12 and twelve stator casing vent holes 5 are uniformly formed in the downstream circumferential direction of the stator casing 1. The gear shaft holes 12 are used for fixing the gear shafts 4. The twelve stator casing vent holes 5 are uniformly distributed in clamping plates 13 on two sides of a downstream brush seal piece. Six stator casing vent holes 5 are formed in each clamping plate and are uniformly distributed in the circumferential direction. An upstream brush seal piece is fixedly mounted on the inner side of the stator casing 1 by a melting and welding process. The gears 2 are connected and fixed by the gear shafts 4 which penetrate through the stator casing 1 by means of the flat keys 3 to provide supporting force required by the downstream brush seal piece. The gears 2 are engaged with the downstream brush seal piece upper side gear teeth 10. A clearance is reserved between the gears 2 and the inner side of the stator casing 1 to ensure that the gears 2 can drive the downstream brush seal piece to rotate. The gear shafts 4 are arranged in corresponding gear shaft holes 12 of the stator casing 1. The gear shafts 4 rotate, by applying active driving force moment, in gear holes to drive the gears 2 to rotate. The downstream brush seal piece vent through holes 9 are formed in the upper side of the downstream brush seal piece and are communicated with the stator casing vent holes 5 to connect upstream gas with downstream gas of the downstream brush seal piece. The gear teeth 10 are formed on the upper side of the downstream brush seal piece. The gear teeth 10 are engaged with the gears 2. The brush wire beam 7 is fixed between the front baffle plate and the rear baffle plate through the melting and welding process. The free end of the brush wire beam 7 is about 0.02 mm away from a rotor 11. The brush wire beam 7 is mounted at an angle of 45 degrees. The front baffle plate 6 and the rear baffle plate 8 are arranged for ensuring the fixation of the brush wire beam 7. In addition, in order to prevent the brushes wires 7 from axially deforming due to great axial pressure drop to affect the sealing performance, the rear baffle plate 8 is slightly longer than the front baffle plate 6. Relevant researches show that the axial pressure drop and the radial pressure drop born by a downstream brush wire beam are great, so there is obvious inter-stage disequilibrium. According to the last-stage pressure drop-adjustable multistage brush seal structure, the reverse driving force moment in an inclined direction of brush wires 7 is given to the gear shafts 4, torsion moment is transferred to the gears 2 through the gear shafts 4, and the downstream brush seal piece gear teeth 10 are engaged with the downstream brush seal piece to transfer the torsion moment to the downstream brush seal piece, such that the downstream brush seal piece rotates around the rotor 11. When the vent through holes 9 in the upper side of the downstream brush seal piece are communicated with the stator casing vent holes 5, a small amount of upstream gas of the downstream brush seal passes through the stator casing vent holes 5 and then flows to downstream through the vent through holes 9 in the upper side of the downstream brush seal to balance inter-stage pressure of the downstream brush seal, so as to reduce the inter-stage pressure difference born by a downstream brush wire beam and prolong the service of a brush seal. When the downstream brush seal piece is within a bearable pressure drop range, the vent through holes 9 in the upper side of the downstream brush seal piece are staggered with the stator casing vent holes 5, thereby reducing a leakage amount and ensuring long-term stable safe and reliable work of the multistage brush seal piece.

The downstream pressure drop-adjustable multistage brush seal structure is simple in structure. Compared with the conventional multistage brush seal structure, the vent holes are formed in the stator casing and the vent through holes are formed in the downstream brush seal piece, which can effectively balance the inter-stage pressure drop, improve the reliability and the durability of the multistage brush seal, and reduce the maintenance cost. Accurate control of the vent amount can be realized by adding a driving force control system to match the number of the gear teeth, and changing the effective circulation area between the vent holes in the upper side of the last-stage brush seal and the vent holes of the stator casing. The gears, the gear shafts, the flat keys, and the like, applied by the disclosure are all interchangeable parts, which facilitates the replacement of damaged parts.

What is claimed is:

1. A downstream pressure drop-adjustable multistage brush seal structure, comprising a stator casing, gears, flat keys, gear shafts, stator casing vent holes, a front baffle plate, a brush wire beam, a rear baffle plate, downstream brush seal piece vent through holes, and downstream brush seal upper side gear teeth, wherein:

the stator casing is stationary; four gear shaft holes and twelve stator casing vent holes are uniformly formed in the downstream circumferential direction of the stator casing; the gear shaft holes are used for fixing the gear shafts; the twelve stator casing vent holes are uniformly distributed in clamping plates of the stator casing on two sides of a downstream brush seal piece; six vent holes are formed in each clamping plate and are uniformly distributed in the circumferential direction;

an upstream brush seal piece is fixedly mounted on the inner side of the stator casing by a melting and welding process;

the gears are connected and fixed by the gear shafts which penetrate through the stator casing by means of the flat keys to provide supporting force required by the downstream brush seal piece; the gears are engaged with the downstream brush seal piece upper side gear teeth; a clearance is reserved between the gears and the inner side of the stator casing to ensure that the gears can drive a downstream brush seal piece to rotate;

the gear shafts are arranged in corresponding gear shaft holes of the stator casing;

the gear shafts rotate, by applying active driving force moment, in gear holes to drive the gears to rotate;

the downstream brush seal piece vent through holes are formed in the upper side of the downstream brush seal piece and are communicated with the stator casing vent holes to connect upstream gas with downstream gas of the downstream brush seal piece;

gear teeth are formed on the upper side of the downstream brush seal piece; the gear teeth are engaged with the gears that are fixed to the gear shafts;

the brush wire beam is fixed between the front baffle plate and the rear baffle plate through the melting and welding process; the free end of the brush wire beam is about 0.02 mm away from a rotor; the front baffle plate and the rear baffle plate are arranged for ensuring the fixation of the brush wire beam; in addition, in order to prevent the brush wire beam from axially deforming due to great axial pressure drop to affect the sealing performance, the rear baffle plate is slightly longer than the front baffle plate.

* * * * *